(12) United States Patent
Zakrzewski

(10) Patent No.: US 8,506,225 B2
(45) Date of Patent: Aug. 13, 2013

(54) MODIFIED ACME SCREW/NUT SET

(75) Inventor: Edward Zakrzewski, Carol Stream, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 825 days.

(21) Appl. No.: 12/350,365

(22) Filed: Jan. 8, 2009

(65) Prior Publication Data

US 2009/0107272 A1 Apr. 30, 2009

Related U.S. Application Data

(62) Division of application No. 11/541,161, filed on Sep. 29, 2006, now Pat. No. 7,490,394.

(60) Provisional application No. 60/722,073, filed on Sep. 29, 2005.

(51) Int. Cl.
*F16B 33/02* (2006.01)

(52) U.S. Cl.
USPC ..................................... 411/366.1; 411/82.5

(58) Field of Classification Search
USPC ..... 411/366.1, 908, 900, 903, 82.5; 74/89.23
See application file for complete search history.

(56) References Cited

U.S. PATENT DOCUMENTS

| | | | | |
|---|---|---|---|---|
| 3,634,002 | A | * | 1/1972 | Vollrath .......................... 359/873 |
| 4,431,354 | A | * | 2/1984 | Griffin ............................ 411/301 |
| 4,704,912 | A | * | 11/1987 | Payne ............................. 74/89.23 |
| 5,252,015 | A | * | 10/1993 | Davis .............................. 411/231 |
| 5,377,395 | A | * | 1/1995 | Maier et al. .......................... 27/2 |
| 5,429,467 | A | * | 7/1995 | Gugle et al. .................... 411/182 |
| 6,948,835 | B2 | * | 9/2005 | King et al. ...................... 362/512 |

\* cited by examiner

*Primary Examiner* — Flemming Saether
(74) *Attorney, Agent, or Firm* — Peter Kendall

(57) ABSTRACT

A nut and screw set for reducing the amount of hindered motion therebetween is disclosed. The nut and screw set includes a screw and a nut. The screw includes a plurality of screw threads. The nut includes a plurality of nut threads. The nut threads are threadably engagable with the screw threads. The nut threads are sized reduce hindered motion between the screw and the nut as a result of thermal expansion of the screw and the nut.

8 Claims, 2 Drawing Sheets

DETAIL I

MODIFIED ACME SCREW/NUT SET

CROSS REFERENCE TO RELATED APPLICATION

This application is a divisional application of U.S. Non-Provisional Patent Application Ser. No. 11/541,161 filed on Sep. 29, 2006, now U.S. Pat. No. 7,490,394. This application claims the benefits of and priority to U.S. Provisional Patent Application Ser. No. 60/722,073 entitled "MODIFIED ACME SCREW/NUT SET" which was filed on Sep. 29, 2005, the entire contents of which are hereby incorporated by reference herein.

BACKGROUND

1. Field of the Disclosure

The present disclosure relates to an Acme screw/nut set, and more particularly to an Acme screw/nut set having a modified thread design.

2. Background of the Art

Drive mechanisms for different applications utilizing a lead screw as a driver usually use a standard Acme screw class G or C. A standard centralizing Acme screw/nut set class C has defined tolerances per ANSI B1.8 specification. Those tolerances provide very low clearances between the thread of the nut and the thread of the screw. For example: a 1½-5 ACME thread class 2C has the following clearances:

for a major diameter a radial clearance is $R_{min}$=0.0012" to 0.0098" and for a pitch diameter an axial clearance is $A_{min}$=0.0025" to 0.14".

The clearances are extremely low for the lower tolerance range. Therefore, a problem arises when using dissimilar materials with significantly different thermal expansion coefficients (e.g. steel and nylon). That is, the clearances will close quickly when the temperature of the joint increases due to the heat generated by friction between the components in the drive mechanism. The problem is especially prevalent in a design where the nut is confined in a rigid housing, thereby restricting radial expansion and allowing expansion of the nut material mainly in the inward direction. The lack of clearance between the screw and the nut may initially result in a grinding noise and finally in seizing the motion of the joint.

The following example is illustrative:

Assume the following materials and dimensions:

Acme screw D=1½" major diameter and P=0.200" made of carbon steel

Acme Nut (modified) of same basic thread with O.D.=1.125" and 2.5" long made of nylon 6 with a thread engagement L=2.312"

Nut housing made of aluminum with bore B=2.125" dia.

Carbon steel has a coefficient of thermal expansion $CTE_s$ 8.1*10 E-6 in./in. ° F.

Nylon 6 has a coefficient of thermal expansion $CTE_n$ 0.45*10 E-4 in./in. ° F.

Aluminum housing has a coefficient of thermal expansion $CTE_h$ 13.1*10 E-6 in./in. ° F.

For the screw/nut pair in this example, it would take a temperature increase ($\Delta T$) of 17° F. from the ambient temperature to close the gap of 0.0012".

The relevant calculations for determining the effect of a temperature rise on the gap are as follows:

The nut material would expand radially inward (Rn) (assuming zero outward expansion allowed by the housing)

$$Rn = \Delta T * CTE_n * D = 17 * 0.45 * 10 * E\text{-}4 * 1.5 = 0.0011475"$$

The screw material would expand radially outward (Rs)

$$Rs = \Delta T * CTE_s * D = 17 * 8.1 * 10 * E\text{-}6 * 1.5 = 0.00020655"$$

The housing material would expand radially outward (Rh) (allowing the nut to expand outward the same amount). However, the expansion of the housing material is to a lesser degree than the expansion of the screw and the nut, due at least in part to the fact that the temperature of the housing material rises only approximately 30% of the temperature rise of the two other components (based on taken measurements).

$$Rh = 0.3 * \Delta T * CTEh(\text{aluminum}) * B = 0.3 * 17 * 13.1 * 10 * E\text{-}6 * 2.125 = 0.00014187"$$

The total expansion (R) of the joint in a radial direction may be calculated as follows:

$$R = Rn + Rs - Rh = 0.0011475 + 0.00020655 = 0.00014197 = 0.001212"$$

The temperature of the Acme screw/nut surface may be subjected to temperatures up to 200° F. based on the material specification of nylon 6, for example, for a high load condition. Accordingly, undue friction and potential binding of machine parts may occur. The screw/nut design of the present disclosure may ameliorate such occurrences.

SUMMARY

The present disclosure relates to a nut and screw set which reduce the amount of hindered motion therebetween caused by thermal expansion of the screw and the nut. The nut and screw set includes a screw (e.g., made of steel) and a nut (e.g., made of plastic). The screw (e.g., a 1½-5 Acme screw) includes a plurality of screw threads and the nut includes a plurality of nut threads, such that the screw and the nut and threadably engagable with each other. The nut threads are sized to reduce hindered motion between the screw and the nut as a result of thermal expansion of the screw and the nut. The temperature change which causes the thermal expansion is disclosed to be between about 100° F. to about 160° F.

In a disclosed embodiment, the screw has a first coefficient of thermal expansion and the nut has a second coefficient of thermal expansion. The two coefficients of thermal expansion are not equal in an embodiment.

In an embodiment, the nut and screw set also includes a housing which is dimensioned to at least partially cover the nut. Additionally, a disclosed nut includes a nut groove which is defined between two adjacent nut threads. The width of the nut groove is disclosed to be in the range of about 0.079 inches to about 0.082 inches.

The present disclosure also relates to a method of modifying a nut in a nut and screw set to reduce hindered motion between the screw and the nut as a result of thermal expansion of the screw and the nut. A disclosed method includes providing a nut and a screw, calculating the amount of thermal expansion for the nut and the screw for a predetermined change in temperature, and increasing the width of the nut groove if the calculated amount of thermal expansion is greater than the existing width of the nut groove.

The present disclosure also relates to a method of determining the width of grooves of a nut in a nut and screw set to optimize operation therebetween and while considering thermal expansion of the nut and the screw.

BRIEF DESCRIPTION OF THE DRAWINGS

The accompanying drawings, which are incorporated in and constitute a part of this specification, illustrate embodiments of the disclosure and, together with a general descrip

DETAILED DESCRIPTION

Figure 1:
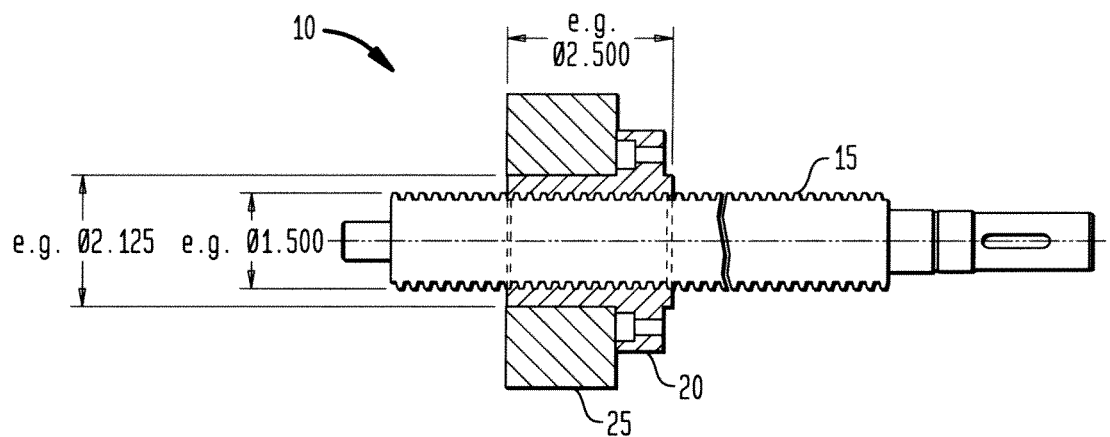
- FIG. 1 is a side view in partial cross-section of a screw/nut set in accordance with an embodiment of the present disclosure.

Various embodiments of the presently disclosed Acme screw/nut set are described in detail with reference to the figures, in which like reference numerals identify corresponding elements throughout the several views. The abbreviation "e.g." in the figures stands for "for example" indicating that the dimensions and angles shown in the figures are exemplary dimensions and angles.

In the context of drive mechanisms and other mechanical devices, a high load application commonly creates a high amount of friction and, consequently, a high temperature condition. The modification of an Acme nut in accordance with the present disclosure minimizes noise generation, excessive friction and motion seizure in a high load condition for Acme screws. A method of calculating the radial clearance required on the major thread diameter, in an effort to minimize loss of performance and motion is also disclosed.

Referring now to FIG. 1, a screw/nut set 10 in accordance with the present disclosure is shown. Screw/nut set 10 includes an Acme screw 15 and a nut 20. Nut 20 is illustrated mounted within nut housing 25. Screw 15 may be an Acme Screw class C, and Acme nut 20 shown in FIG. 1 may include a modified internal thread in accordance with the present disclosure. Screw/nut set 10 illustrated in FIG. 1 is representative of a 1½-5 screw having a diameter (x) equal to 1.50 inches. The diameter (y) of nut 20 is equal to 2.125 inches. These dimensions are provided as examples only and not provided to, nor intended to, limit the scope of this disclosure. It is contemplated that this disclosure is not directed to any one particular size screw and/or nut. Rather, the present disclosure may be applied to a plurality of screws and nuts having a plurality of different dimensions.

The following formula is applied to determine the minimum required clearance as a function of a predetermined temperature rise ($\Delta T$) above the ambient temperature. The minimum required clearance is defined as the clearance necessary to essentially prevent seizure of the motion of the mechanical components at the elevated temperatures encountered during normal working conditions.

Since nut 20 is restrained on its outer periphery by housing 25, as the temperature of nut 20 increases, nut 20 will expand radially inward. An assumption is being made that there will be no outward expansion of nut 20 due to the restraining force exerted by nut housing 25. The amount of thermal expansion of nut 20 is calculated by the following equation where Rn is representative of the amount of thermal expansion. CTEn represents the coefficient of thermal expansion of the nut material, $\Delta T$ represents the raise in temperature from the ambient temperature, and D represents the major diameter of nut 20.

$$Rn = \Delta T * CTEn * D$$

Similarly, screw 15 is a solid mass and, therefore, will expand radially outward as its temperature increases. The amount of thermal expansion of screw 15 is calculated by the following equation where Rs is representative of the amount of thermal expansion of screw 15. CTEs represents the coefficient of thermal expansion of the screw material, $\Delta T$ represents the raise in temperature from the ambient temperature, and D represents the major diameter of Acme screw 15.

$$Rs = \Delta T * CTEs * D$$

The material of nut housing 25 will also expand radially outward as its temperature increases. The amount of thermal expansion of the housing 25 is calculated by the following equation where Rh is representative of the amount of thermal expansion of nut housing 25. Nut 20 is able to expand radially outward in an amount which is proportional to the amount of expansion of nut housing 25. CTEh represents the coefficient of thermal expansion of the housing material, $\Delta T$ represents the raise in temperature from the ambient temperature, and the variable B represents the diameter of the bore of nut housing 25.

$$Rh = 0.3 * \Delta T * CTEh * B$$

The required clearance on the minor diameter due to the thermal expansion may be calculated by the following equation:

$$R = Rn + Rs - Rh = \Delta T * CTEn * D = \Delta T * CTEs * D - 0.3 * \Delta T * CTEh * B$$

$$R = \Delta T \{D(CTEn = CTEs) - 0.3 * CTEh * B\}$$

Utilizing the values in the example described above, the following results are obtained:

$$R = 17\{1.5(0.45*10*E-4 + 8.1*10*E-6) - 0.3*13.1*10*E-6*2.125\} = 0.001212''$$

Thus, the total radial clearance required on the minor diameter of the thread including a factor of safety (g) is calculated as follows:

$$Rt = Rn + Rs - Rh + g = \Delta T * CTEn * D += \Delta T * CTEs * D - 0.3 * \Delta T * CTEh * B + g$$

$$Rt = \Delta T \{D(CTEn + CTEs) - 0.3 * CTEh * B\} + g$$

The factor of safety contemplates, for example, extra radial clearance on the minor diameter of the thread for grease retention and a misalignment accommodation.

Applying the values of the example given above with a temperature rising from 70° F. to 200° F. ($\Delta T = 130°$ F.) and factor of safety of g=0.004" the total clearance will be as follows:

$$Rt = 130\{1.5(0.45*10*E-4 + 8.1*10*E-6) - 0.3*13.1* 10*E-6*2.125 + 0.004 = 0.0133''$$

The clearance value may be rounded up to 0.014"+0.003".

Since there will be an axial backlash increase due to the radial clearance increase, the width of the internal thread of nut 20 is adjusted to achieve a minimum axial clearance, in the design of the modified centralized AcmesScrew/nut set 10 in accordance with the present disclosure.

Figure 2:
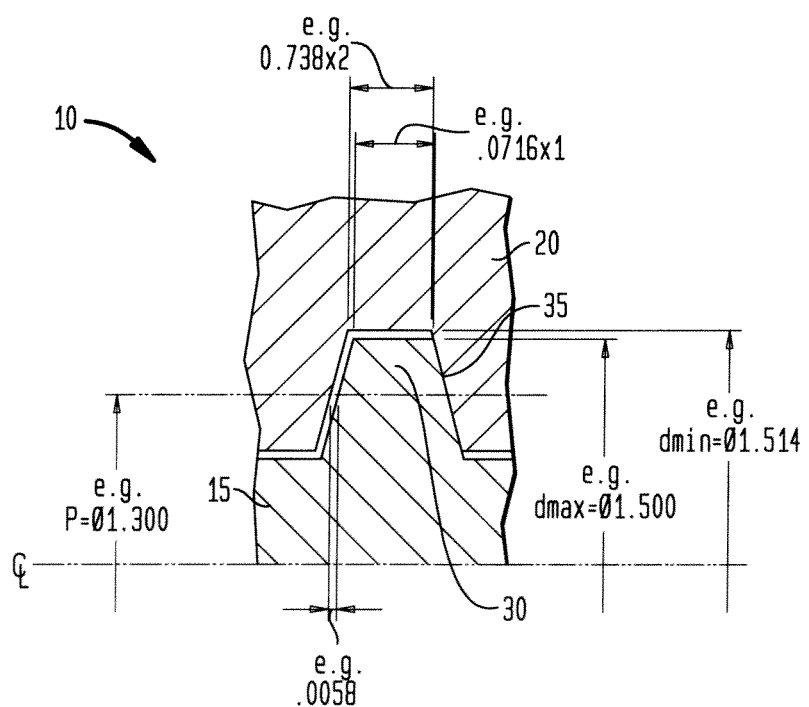
FIG. 2 is an enlarged side view in cross-section of a modified Acme thread configuration on major diameter in accordance with an embodiment the present disclosure.

Referring now to FIG. 2, a modified Acme thread configuration on minor diameter in accordance with the present disclosure is illustrated. Width X1 of the screw thread 30 on major diameter and width X2 of thread groove 35 of nut 20 also on the minor diameter are shown as per ANSI B 1.8 standard without any modification. Thread 30 of screw 15 remains unchanged. Screw 15 is shown crowded to the one side of the thread 35 of nut 20.

Figure 3:
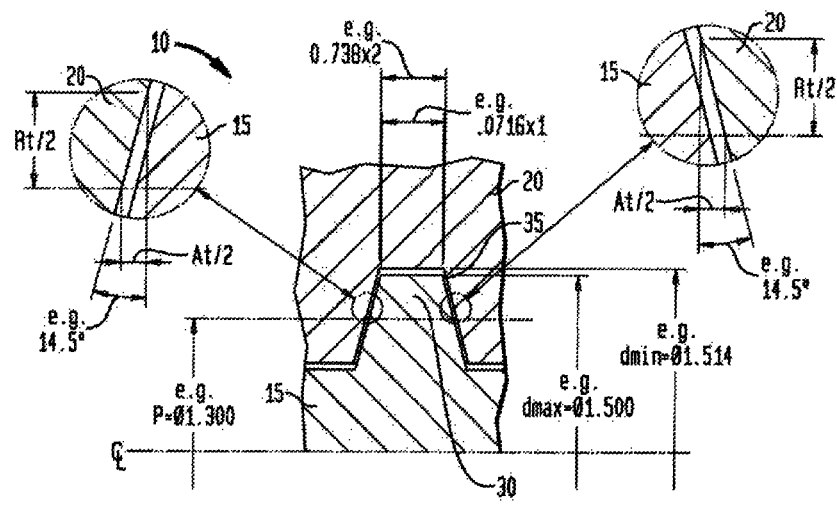
FIG. 3 is a side view in cross-section of a modified Acme thread configuration on a major diameter in accordance with an embodiment of the present disclosure with the details showing the relation between radial and axial clearances in the thread.

The axial clearance expanded from Amin=0.0025" to 0.0058" based on the relationship between radial and axial clearances shown in FIG. 3. Referring to FIG. 3, an Acme thread modified on minor diameter in accordance with the above-described example is illustrated. The detail views in FIG. 3 illustrate the relationship between radial and axial clearances in the thread.

The increase in axial clearance (backlash) is governed by the following equations:

$$\Delta A/\Delta R = tg14.5° \text{ where } \Delta R = Rt - R\min. \text{ (from previous calculations)}$$

$$\Delta A = (Rt - R\min)*tg14.5°$$

Therefore, the total backlash $\Delta Ar$ due to an increase in radial clearance and an initial minimum axial backlash is a sum of $\Delta A$ and Amin.

$$\Delta Ar = \Delta A + A\min. = (Rt - R\min.)*tg14.5° + Ad\min.$$

In the example described herein:

$$\Delta Ar = (0.014-0.0012)*tg14.5° + 0025 = 0.0128*0.2586 + 0025 = 0.0058"$$

In accordance with an embodiment of the present disclosure, groove 35 of nut 20 is widened to accommodate an axial thermal expansion difference between the material of screw 15 and the material of nut 20. The expansion of nut 20 in the axial direction is calculated in accordance with the following equation:

$$\Delta An = \Delta T*CTEn*L \quad L\text{—length of the nut}$$

Next, the expansion of screw 15 in the axial direction for the length of nut 20 is calculated in accordance with the following equation:

$$\Delta As = \Delta T*CTEs*L$$

Thus, the total required axial backlash due to the thermal expansion may be calculated in accordance with the following equation:

$$At = \Delta An - \Delta As = \Delta T*CTEn*L - \Delta T*CTEs*L = \Delta T*L*(CTEn - CTEs) \text{ where } \Delta An > \Delta As$$

The value derived from this calculation represents the minimum backlash at the pitch diameter. Groove 35 of nut 20 may be physically enlarged to provide this backlash. As determined above, the backlash is equal to $\Delta Ar$ and is due to the increase of clearance in the radial direction. Consequently, groove 35 of nut 20 may be widened based on the difference between total thermal expansion requirement At and an existing backlash $\Delta Ar$ as shown in the following equation to determine Afin:

$$A fin = At - \Delta Ar = \Delta T*L*(CTEn - CTEs) - (Rt - R\min)*tg14.5° - A\min$$

$$A fin = \Delta T*L*(CTEn - CTEs) - [(\Delta T\{D(CTEn + CTEs) - 0.3*CTEh*B\} + g - R\min]*tg14.5° - A\min$$

After applying the values from the example described above, the following value Afin can be derived from the above formula:

$$A fin = 130*2.312*(.45*10*E-4 - 8.1*10*E6) -$$
$$[130\{1.5(.45*10*E-4 + 8.1*10*E-6) - .3*13.1*10*E-6*2.125\} +$$
$$.004 - .0012]*tg14.5° - .0025.$$

$$A fin = .00546"$$

This Afin value is the dimension value which has to be added to the Existing width of groove 35 of nut 20. In the example described herein, the minimum width for the top of groove 35 is 0.738" based on ANSI B1.8 (see FIG. 2). After adding 0.00546 (Afin) to that dimension the final groove width Wg is:

$$Wg = 0.773"$$

The additional axial clearance may be added to the Wg dimension if necessary. In this case, due to the flexibility of the plastic nut material with an unobstructed expansion flow in the axial direction, no additional clearance was implemented other than the positive tolerance.

Figure 4:
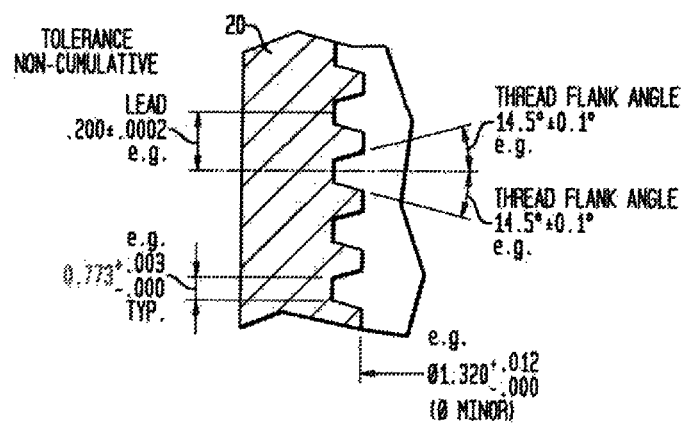
FIG. 4 is an enlarged side view in cross-section of a modified Acme thread configuration on a major diameter in accordance with an embodiment of the present disclosure.

As illustrated in FIG. 4, nut 20 of the drawing calls for 0.773"+0.003/−0.000. FIG. 4 shows the Acme nut drawing in cross-section detail with the dimension 0.773+0.003/−0.000.

While the above description contains many specifics, these specifics should not be construed as limitations on the scope of the present disclosure, but merely as illustrations of various embodiments thereof. For example, although the above embodiments are described with reference to one particular configuration of a screw/nut set, the present disclosure may find application in conjunction with screw/nut sets having many different configurations and dimensions. Accordingly, it is contemplated that the disclosure is not limited to such an application and may be applied to various screw/nut sets. Those skilled in the art will envision many other possible variations that are within the scope and spirit of the present disclosure.

What is claimed:

1. A mating nut and drive screw set, comprising:
   an ACME drive screw including a plurality of screw threads having a screw major diameter of 1.5 inches, a thread pitch of 0.2 inches and a screw groove width of 0.716 inches; and
   a nut including a plurality of mating nut threads and being threadably engagable with the screw, wherein the nut threads are sized with larger nut minor diameter of 1.514 inches and nut groove width of 0.743 to 0.746 inches to compensate for thermal expansion of the screw and the nut over a temperature range, to reduce hindered motion between the screw and the nut as a result of the thermal expansion.

2. The nut and screw set of claim 1, wherein the screw is essentially made of steel.

3. The nut and screw set of claim 1, wherein the nut is essentially made of a plastic material.

4. The nut and screw set of claim 1, wherein the screw has a first coefficient of thermal expansion and the nut has a second coefficient of thermal expansion.

5. The nut and screw set of claim 4, wherein the first coefficient of thermal expansion is not equal to the second coefficient of thermal expansion.

6. The nut and screw set of claim 1, further comprising a housing dimensioned to at least partially cover the nut.

7. A nut and screw set for a drive mechanism operable in a change in temperature range ($\Delta T$), comprising:
   a screw having: a coefficient of theimal expansion ($CTE_s$), a plurality of screw threads having a major diameter (D), a screw thread width (X1) and a thread groove flank angle ($\theta$); and
   a plastic nut having: a coefficient of thermal expansion ($CTE_n$), an axial length (L), a plurality of nut threads that are engaged with the screw threads, the nut threads having a minor diameter $D_n$ and a groove width $W_g$ therebetween, wherein $D_n$ and $W_g$ are dimensioned to compensate for thermal expansion so as to maintain at the upper limit range of $\Delta T$ a minimum desired radial clearance ($R_{min}$), as well as a desired minimum axial clearance ($A_{min}$) between the respectively engaged screw and nut threads in accordance with the following formulas:

$$D_n = D + R_{min} + \Delta T * \{D*(CTE_n + CTE_s)\}[[+g]]$$

$$W_g = X1 + A_{min} + \Delta T * L * (CTE_n - CTE_s) + [(\Delta T * \{D*(CTE_n + CTE_s)\}[[+g]] - R_{min}] * tg\theta$$

where
tg=tangent of angle.

8. A nut and screw set for a drive mechanism operable in a change in temperature range ($\Delta T$), comprising:
- a screw having: a coefficient of thermal expansion ($CTE_s$), a plurality of screw threads having a major diameter (D), a screw thread width (X1) and a thread groove flank angle ($\theta$);
- a plastic nut having: a coefficient of thermal expansion ($CTE_n$), an axial length (L), a plurality of nut threads that are engaged with the screw threads, the nut threads having a minor diameter $D_n$ and a groove width $W_g$ therebetween; and
- a nut housing dimensioned to at least partially retain the nut therein having: a coefficient of thermal expansion ($CTE_h$), and a cavity retaining the nut therein having a diameter(B);
- wherein: $D_n$ and $W_g$ are dimensioned to compensate for thermal expansion so as to maintain at the upper limit range of $\Delta T$ a minimum desired radial clearance ($R_{min}$), as well as a desired minimum axial clearance ($A_{min}$) between the respectively engaged screw and nut threads in accordance with the following formulas:

$$D_n = D + R_{min} + \Delta T * \{D*(CTE_n + CTE_s) - \Lambda*CTE_h*B\}[[+g]]$$

$$W_g = X1 + A_{min} + \Delta T * L * (CTE_n - CTE_s) + [(\Delta T * \{D*(CTE_n + CTE_s) - \Lambda*CTE_h*B\}[[+g]] - R_{min}] * tg\theta$$

where
tg=tangent of angle
$\Lambda$=percentage of temperature range $\Delta T$ heating the housing.

* * * * *